(12) United States Patent
Papismedov et al.

(10) Patent No.: US 9,812,969 B2
(45) Date of Patent: Nov. 7, 2017

(54) GROUND LEAKAGE POWER SUPPLY FOR DIMMING APPLICATIONS

(71) Applicant: Leviton Manufacturing Co., Inc., Melville, NY (US)

(72) Inventors: Levan Papismedov, Middle Island, NY (US); Alfred Lombardi, Syosset, NY (US); Michael Ostrovsky, Brooklyn, NY (US); Ozgur Keser, Ronkonkoma, NY (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 316 days.

(21) Appl. No.: 14/554,697

(22) Filed: Nov. 26, 2014

(65) Prior Publication Data

US 2016/0149496 A1    May 26, 2016

(51) Int. Cl.
| | | |
|---|---|---|
| *H02J 1/10* | (2006.01) | |
| *H02J 3/38* | (2006.01) | |
| *H02J 3/32* | (2006.01) | |
| *H02M 3/335* | (2006.01) | |
| *H02M 1/08* | (2006.01) | |
| *H02M 5/257* | (2006.01) | |
| *H02M 1/00* | (2006.01) | |

(52) U.S. Cl.
CPC ....... *H02M 3/33507* (2013.01); *H02M 1/083* (2013.01); *H02M 5/2573* (2013.01); *H02M 2001/0006* (2013.01); *H02M 2001/0032* (2013.01); *Y02B 70/16* (2013.01)

(58) Field of Classification Search
CPC ...... H02M 7/44; H02M 3/158; H02M 3/1584; H02M 7/04; H02M 1/083; H02M 7/49; H02M 1/088; H02M 1/10; H02M 1/12; H02M 2001/0032; H02M 2001/0058; H02M 2001/007; H02M 2001/0093; H02M 3/00; H02M 3/04
USPC ...................................... 307/56, 52
See application file for complete search history.

(56) References Cited

U.S. PATENT DOCUMENTS

| | | | |
|---|---|---|---|
| 6,031,750 A | 2/2000 | Bruccoleri et al. | |
| 7,190,125 B2 * | 3/2007 | McDonough | H05B 37/0209 307/115 |
| 7,804,255 B2 | 9/2010 | Ostrovsky et al. | |
| 7,834,560 B2 | 11/2010 | Ostrovsky et al. | |
| 8,618,751 B2 | 12/2013 | Ostrovsky et al. | |
| 8,736,193 B2 | 5/2014 | Gallo | |
| 2006/0110655 A1 * | 5/2006 | Wirdel | B60L 3/003 429/61 |

(Continued)

FOREIGN PATENT DOCUMENTS

WO     2009015148 A2    1/2009

OTHER PUBLICATIONS

International Search Report dated Mar. 31, 2016.

*Primary Examiner* — Carlos Amaya
*Assistant Examiner* — Esayas Yeshaw
(74) *Attorney, Agent, or Firm* — Matthew M. Hulihan; Heslin Rothenberg Farley & Mesiti PC

(57) ABSTRACT

A dimmer is provided for controlling power to a load, the dimmer having a ground leakage power supply deriving power from a connection of the dimmer to ground. The power supply may be a switching-mode power supply that can be the sole or primary power supply to power operation of the dimmer, including operation of the controller.

20 Claims, 4 Drawing Sheets

(56) References Cited

U.S. PATENT DOCUMENTS

| | | | |
|---|---|---|---|
| 2006/0152085 A1* | 7/2006 | Flett | B60L 9/30 |
| | | | 307/75 |
| 2009/0027219 A1* | 1/2009 | Ostrovsky | H05B 39/04 |
| | | | 340/650 |
| 2010/0090618 A1* | 4/2010 | Veltman | H05B 33/0815 |
| | | | 315/307 |
| 2011/0199014 A1 | 8/2011 | Pitigoi-Aron et al. | |
| 2011/0248835 A1* | 10/2011 | Speegle | G08C 19/02 |
| | | | 340/12.32 |
| 2011/0273906 A1* | 11/2011 | Nichol | G02B 6/0076 |
| | | | 362/607 |
| 2011/0285301 A1* | 11/2011 | Kuang | H05B 33/0845 |
| | | | 315/200 R |
| 2013/0113453 A1 | 5/2013 | Shilling | |
| 2013/0300301 A1 | 11/2013 | Miyahara et al. | |
| 2014/0049185 A1* | 2/2014 | Neser | H05B 33/0803 |
| | | | 315/250 |
| 2014/0319932 A1* | 10/2014 | Russell | H02J 3/01 |
| | | | 307/125 |
| 2015/0048753 A1* | 2/2015 | Chen | H05B 33/0806 |
| | | | 315/250 |

* cited by examiner

GROUND LEAKAGE POWER SUPPLY FOR DIMMING APPLICATIONS

BACKGROUND

Predominately in retrofit applications, when replacing a light switch or an incandescent dimmer, the field wiring has two wires (not including ground)—a hot/phase wire and a load wire, i.e., no neutral wire. Two primary issues are presented when trying to control certain loads, such as light emitting diode (LED) or compact fluorescent lamp (CFL) loads, in these situations where no neutral wire is present. The first is to provide a stable zero crossing reference in order to control the light intensity without flickering. The other challenge is in generating enough energy within the power supply of the lighting control to supports its operation, while allowing the lighting load to remain in an off condition (i.e. without the light being illuminated).

BRIEF SUMMARY OF THE INVENTION

A dimmer is provided for controlling power to a load. The dimmer includes a phase input terminal configured to couple to an AC power source for powering the load; a ground terminal configured to couple to a ground connection; a load output terminal configured to couple to the load for supplying power thereto; a controller for controlling a switching circuit electrically coupled between the line input terminal and the load output terminal to control supply of power to the load; and a power supply. The power supply includes a ground leakage power supply configured to derive power from a connection of the dimmer to the ground terminal, the ground leakage power supply including a switching-mode power supply, wherein the ground leakage power supply is configured to power operation of the dimmer including operation of the controller.

Additionally, a dimmer is provided for controlling power to a load, the dimmer including: a phase input terminal configured to couple to an AC power source for powering the load; a ground terminal configured to couple to a ground connection; a load output terminal configured to couple to the load for supplying power thereto; a controller for controlling a switching circuit electrically coupled between the line input terminal and the load output terminal to control supply of power to the load, wherein the controller is configured to provide a signal to the switching circuit to provide power to the load, the signal provided starting at a firing angle of a half-cycle of the AC power source, and the signal including a plurality of pulses provided during the half-cycle of the AC power source; and a power supply including a ground leakage power supply configured to derive power from a connection of the dimmer to the ground terminal, the ground leakage power supply including a switching-mode power supply, wherein the ground leakage power supply is configured to power operation of the dimmer including operation of the controller to provide the signal.

Further, a dimmer is provided for controlling power to a load, the dimmer including: a phase input terminal configured to couple to an AC power source for powering the load; a ground terminal configured to couple to a ground connection; a load output terminal configured to couple to the load for supplying power thereto; a controller for controlling a switching circuit electrically coupled between the line input terminal and the load output terminal to control supply of power to the load, wherein the controller is configured to provide a signal to the switching circuit to provide power to the load, the signal including a plurality of pulses provided during the half-cycle of the AC power source, and the plurality of pulses having a duration of 8-12 microseconds and having a duration therebetween of 8-12 microseconds; and a power supply including a ground leakage power supply configured to derive power from a connection of the dimmer to the ground terminal, the ground leakage power supply including a switching-mode power supply, wherein the ground leakage power supply is configured to power operation of the dimmer including operation of the controller to provide the signal.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
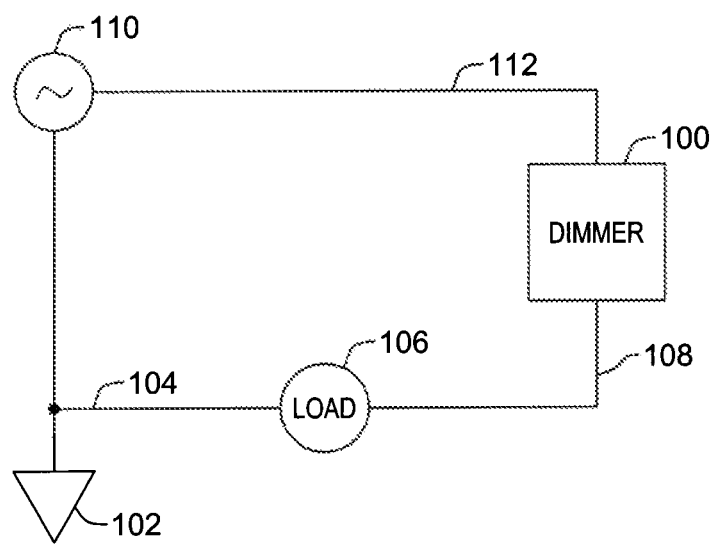
FIG. 1 depicts an example of a dimming system including a two-wire dimmer.

Disclosed herein are various dimmers and digital/electronic lighting controls for controlling electrical power to a load absent the use of a neutral wire. Example loads include lighting loads such as incandescent, LED, or CFL lighting loads.

More specifically, aspects described herein facilitate use of a ground connection as a return path of the source of power for powering a digital lighting control without the need for a neutral connection. In using a ground connection, UL (Underwriters Laboratories) limits an amount of current that can be "leaked" to ground, which presently is 0.5 milliamps (500 µA). A ground leakage power supply is provided to supply enough energy to the dimmer so that it may to perform its function, while current leakage remains below the maximum allowed by UL.

By way of background, many countries have an electric grid infrastructure that uses alternating current as a power source (referred to herein as an "AC source"). These systems can be either balanced or unbalanced and may include a phase line and a return path (usually referred to as a "neutral" line). The "neutral" line can be used as a return path for the AC source supplied by a phase line. (A line is a conductive path that can also be referred to as a "wire". The terms "line", "conductive line", and "wire" are considered herein to be synonymous.) For safety reasons, the neutral wire is typically grounded at some juncture, for instance the main electrical panel, and a ground wire is typically present at any electrical box.

Many dwellings and office buildings use either a single or multi-phase AC source and/or some combination thereof. The AC source may be accessed by standardized connections (referred to as "plugs") that prevent a user from improperly connecting to an AC source, e.g., a three-phase AC plug cannot connect to a two-phase AC outlet. Additionally, many AC sources may selectively apply electricity to a load based upon whether a switch is turned on or off, e.g., a light switch.

As will be discussed below, it is generally known how to control the brightness of a light by using a dimmer (or "dimming switch") that is connected in a two wire installation between a hot line and a load line (the load line connects to the load, and the load in turn, is connected to the neutral line, thus forming a complete circuit). The power supplies for these dimmers usually use current flowing between the hot line connection to the dimmer that flows through to the load via the load line, and consequently through the load to the neutral line. By having the ability to omit a direct connection to the neutral line, a dimmer may be quickly and easily installed as a replacement for a mechanical on/off switch in the event that a neutral connection is not available. This avoids potentially having to rewire the existing installation which can be expensive and time consuming.

Typically these so-called two-line/two-wire dimmers control the power provided to the load by utilizing a solid state switching device to employ phase control, i.e., "chop" the AC waveform. The solid state switching device may be, e.g., a Thyristor, Triode for Alternating Current (TRIAC), Silicon-controlled Rectifiers (SCRs), Metal-Oxide-Semiconductor Field-Effect Transistors (MOSFETs), Insulated-Gate Bipolar Transistor (IGBT) or similar solid state switching devices to perform phase control. During operation, the switching device provides power to the load during a portion of every half cycle of an AC source. The ratio between the portions of the half cycle when power is provided to the load and not provided to the load is dependent on the intensity setting of the dimmer. In such two wire dimmers, the dimmer power supply is energized by using a portion of the half cycle when the solid state switching device is not conducting and enables the provision of power to the dimmer's various components.

Challenges exist in using two-line dimming systems incorporating a two-line dimmer. First, since the load affects how much power can be provided to the dimmer, two-line dimmers may not have their minimum power load requirement met in order to function properly when used with certain low power loads. If the load power rating (or maximum power dissipation) is less than the minimum power load requirement (typically 25-40 W), the dimmer receives inadequate power to operate, causing the dimmer to stop working. Another challenge with two-line dimmers is that if the load becomes inoperative, e.g., burned-out, the two-line dimmer cannot power itself (e.g., the conductive path of the load to neutral becomes an open circuit), creating the impression of a broken device.

Referring to the drawings, FIG. 1 shows a dimming system having a two-line dimmer 100 that is indirectly connected to neutral 102 via neutral line 104 through load 106 and finally via load line 108. The neutral 102 partly forms a return path or current path for the current that travels from AC source 110 via hot wire or line 112 through dimmer 100 and through load 106 via load wire or line 108 and eventually to neutral 102 via neutral wire or line 104.

Consider the case in which dimmer 100 includes a mechanism to control the power dissipation of load 106 by "chopping" the current coming from AC source 110. A controller may operate the power switch to regulate the RMS power transferred to the load using a phase control technique. A voltage available from the AC power source oscillates though positive and negative cycles—each line cycle of the AC power source has a positive half cycle beginning at a first zero crossing at time $t_0$ and ending at a midpoint zero crossing at $t_2$. The AC line cycle then has a negative half cycle beginning at $t_2$ and ending at another zero crossing at $t_4$. For common 60 Hz power, the entire line cycle from $t_0$ to $t_4$ lasts 1/60th of a second.

At the beginning of the line cycle, the power switch (e.g. TRIAC) remains off during a delay period. At time $t_1$, between $t_0$ and $t_2$, the TRIAC is turned on by holding a gate or supplying one (or a few) pulses to the TRIAC to connect the power source to the load. The portion of the AC voltage waveform actually applied to the load is that portion extending from $t_1$ to the end of the half-cycle at $t_2$ (e.g. the conduction period). The TRIAC continues conducting power to the load during this time until it switches off at (or near) the zero crossing at time $t_2$. TRIACs are self-commutating devices, meaning that they turn themselves off when the current through the device falls below a holding level after the control signal had been removed. The same process is repeated for the negative half cycle, in which the TRIAC turns on at some time $t_3$, between $t_2$ and $t_4$, and turns off at (or near) $t_4$. Generally, if the load is purely resistive, the current flowing through the load has essentially the same waveform as the portion of the AC voltage applied to the load.

Varying the conduction period (i.e. the time of $t_1$ and of $t_3$) varies the percentage of available power delivered to the load, thereby regulating the total amount of power delivered to the load. If the load is a lighting load, regulating the amount of power controls the brightness of the load.

The time periods described above are often described in terms of angles where an entire AC line cycle is 360 degrees. Thus, the conduction period ($t_1$ to $t_2$ or time $t_3$ to $t_4$) is commonly referred to as the conduction angle, while the delay period ($t_0$ to $t_1$ or $t_2$ to $t_3$) is typically referred to as the firing angle, the delay angle, or the triggering angle It is understood that while other types of power switches, like MOSFETs and IGBTs, are similarly used to control conduction and firing angles, the controlling of these switches may be different from the manner described above.

Some power switches, such as transistors and relays, receive a constant gate signal during the entire conduction period. Other power switches, such as TRIACs and SCRs, have regenerative switching properties that cause them to latch in the conductive state in response to short gate pulse(s) if the load current exceeds a latching level. Once in the conductive state and the control signal is removed, the power switch remains conductive until the current through the switch drops below a holding level, at which point the power switch automatically switches off. This typically occurs when the load current drops below the holding level at or near a zero crossing.

By way of specific example, a gate pulse may be used for a transistor or other power switch requiring a continuous gate pulse during the entire conduction period from $t_1$ through $t_2$. Thus, the gating operation consumes power during the entire conduction period. This technique can be, and in some instances is, used to maintain a latching power switch such as a TRIAC or SCR in a conducting state when there may otherwise not be enough current to do so inherently.

In another example, a short gate pulse may be used to trigger a TRIAC or SCR at time $t_1$, which, under appropriate conditions, latches on for substantially the remainder of the half-cycle. In this case, the gating operation consumes power only during a small fraction (duration of the short gate pulse) of the conduction period, thereby reducing the overall power consumption.

This short gate pulse gating technique may work adequately with a purely resistive load, however a different set of challenges is presented when used with loads having a capacitive input or other nonlinear characteristics. For example, the input current of a CFL bulb typically does not follow the waveform of the input voltage to the dimmer device. Instead, the input current tends to flow in the form of short duration, high magnitude pulses, in which the voltage may begin rising at time $t_0$, but the CFL may not draw any current until some much later time ($t_a$) in the half-cycle. At that point, the current may climb rapidly until reaching a peak, then fall rapidly until reaching essentially zero at some time ($t_b$) before the end of the half cycle at time $t_2$. This is in contrast to a resistive load in which the current follows the voltage waveform. If a short gate pulse is applied to the TRIAC during the time period between $t_0$ and $t_a$, the CFL may fail to turn on and/or remain on. That is, since the gate pulse is applied at a time when the CFL draws no current, the switching device, e.g., the TRIAC, may not turn on at all, and the entire half cycle of conduction may be missed. Alternatively, if the gate pulse is applied at a time when the CFL may draw some current, but not enough to latch the TRIAC in the conductive state, the CFL may receive power only during the duration of the gate pulse, and the result may be a short flash of light from the CFL, i.e., flickering. Thus, the firing angle corresponding to time $t_a$ could represent the limit for maximum brightness, i.e., the maximum possible conduction time.

Likewise, there is typically a firing angle corresponding to a minimum brightness close to the end of the half cycle. If the TRIAC is gated too late, it may fail to conduct any power to the CFL or it may only conduct during the gate pulse period if the CFL does not draw enough current to latch the TRIAC or hold the TRIAC in the conductive state for the appropriate length of time. The result may be a flicker of light, or the lamp may turn off abruptly rather than dimming smoothly as the lower end to the dimming range is approached. Problems at the lower end of the range may be compounded by the decreasing line voltage that is available, as well as the short duration of the conduction period through the TRIAC.

The firing angles for minimum and maximum brightness for any given load, however, may not be known in advance. Moreover, the firing angle limits may change due to variations in operating conditions such as lamp wattage, number of lamps on the circuit, line voltage, temperature, etc., as well as variations between lamps from different manufacturers, manufacturing tolerances, etc.

One way to assure that the TRIAC will be triggered when operating near the point of maximum brightness is to continue gating the TRIAC during the entire conduction period. Then, even if the gate pulse begins before $t_a$, the continuous gating assures that the TRIAC will eventually begin conducting when the CFL begins drawing current at time $t_a$. This may, however, consume more power than the power supply can provide.

Another technique for accommodating uncertainty in the firing angle at maximum brightness involves the use of multiple gate pulses. Using enough pulses over an appropriate length of time may assure that one of the pulses will trigger the TRIAC at a time when the CFL will draw enough current to latch. Because two-wire dimmers are limited in the amount of power they can draw through the load, use of latching power switches that can be triggered by short pulses may be adopted because it reduces the amount of power required by a controller.

In accordance with aspects described herein, pulsing is provided at some starting point (e.g. at or before $t_1$, for instance) and continuing through the whole half cycle. The pulses used may be short 10-15 μs in duration, which provides enough time to latch a TRIAC or other power switch. Additionally, the time between pulses may also be kept small (for instance 10-15 μs) in order to prevent the TRIAC from unlatching, even if current through the load is insufficient to keep the TRIAC latched. By substituting pulsing for continuous gating, main current consumption of the dimmer is reduced by at least 50% if the duty cycle is 50%, and provide even further reduction when duty cycle is less than 50%.

Figure 2:
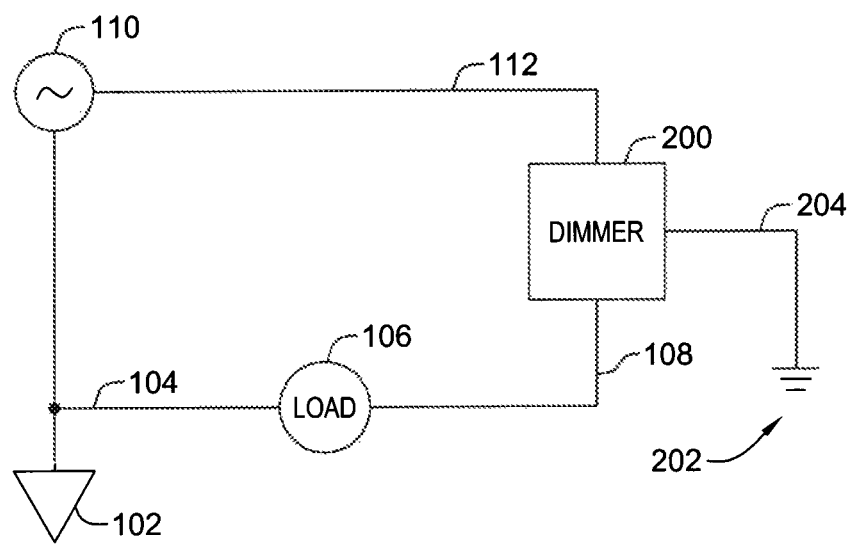
FIG. 2 depicts an example of a dimming system including a two-wire dimmer and having a power supply connection to ground.

FIG. 2 shows another dimming system having a two-wire dimmer 200 that has a power supply connection to ground 202. Dimmer 200 again uses AC source 110 and neutral 102 and is similar to dimmer 100 of FIG. 1, however, note that in FIG. 2, dimmer 200 has a current path or an alternative return path to earth ground 202. The alternative return path is partly formed by earth ground line 204. Earth ground 202 may be a physical connection to the earth, e.g., via copper rods driven into the ground, as one example.

Figure 3:
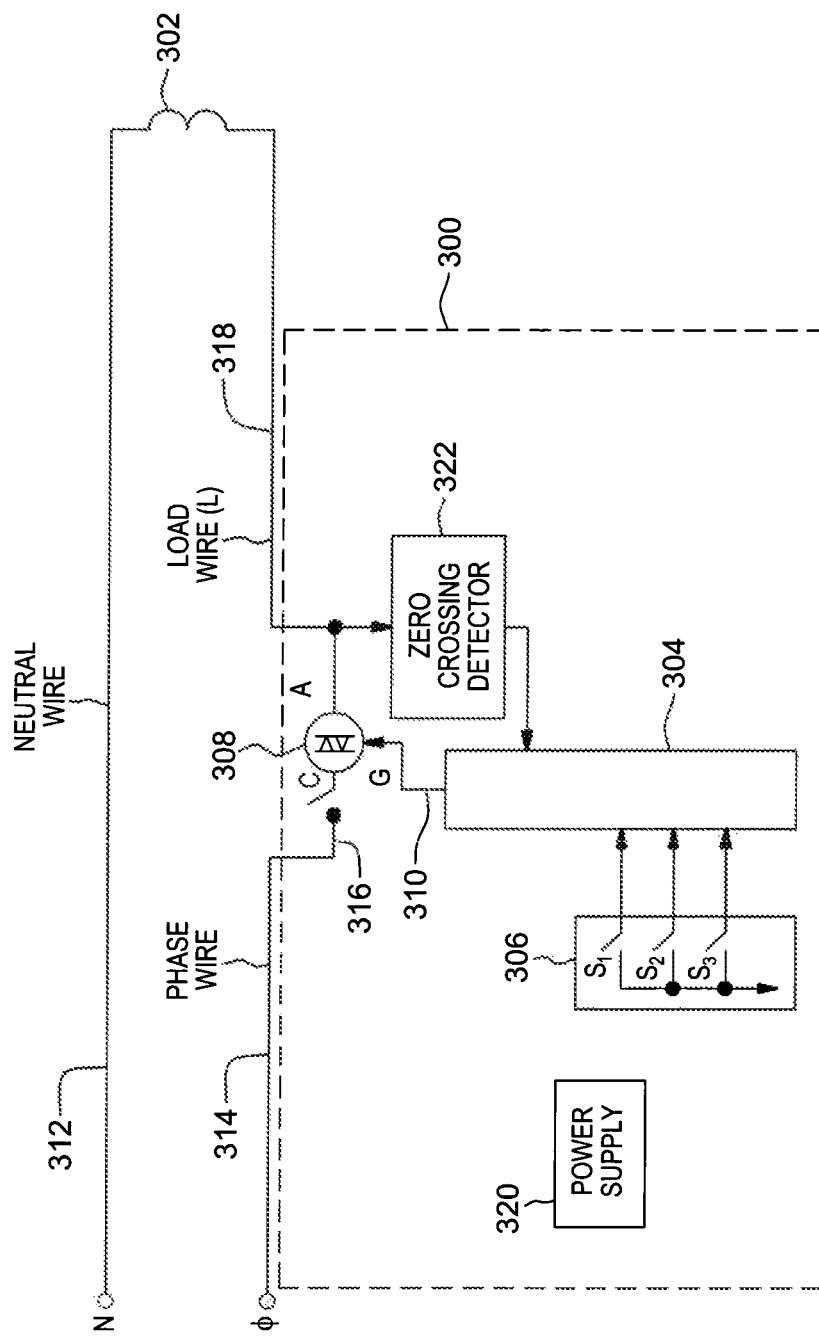
FIG. 3 depicts further details of a two-wire dimmer.

Further details of a two-wire dimmer are depicted and described with reference to FIG. 3. In FIG. 3, dimmer 300 activates and controls power to load 302, the power being supplied via a phase (hot) wire 314 and load wire 318.

The dimmer includes digital control electronics 304, which includes, for instance, a microprocessor/microcontroller and code for execution. Digital control electronics 304 are coupled to user-accessible actuators 306. A user of dimmer 300 is able to engage actuator(s) 306, which the digital control electronics 304 may interpret as a command (or a set of commands) to perform one or more actions for controlling/powering load 302. In response to the received command information, dimmer 300 can then control/power load 302.

Dimmer 300 can control, for example, the amount of current flowing through load 302 by proper activation of a Triode for Alternating Current (TRIAC) 308, as described above. TRIAC 308 is a bidirectional three terminal semiconductor device that allows bidirectional current flow when an electrical signal of proper amplitude is applied to its "G" (or gate) terminal via control line 310. TRIAC 308 also has a "C" (or cathode terminal) and an "A" or anode terminal. When an electrical signal is applied to the gate G, TRIAC 308 is said to be gated. When properly gated, current (or other electrical signal) can flow from the "C" terminal to the "A" terminal or from the "A" terminal to the "C" terminal. When TRIAC is not gated or is not properly gated, relatively very little or substantially no current (or no signal) can flow between the "A" and "C" terminals. TRIAC 308 thus acts as an electrically controlled power switch that can allow some or no current flow based on the amplitude of the electrical signal applied to its "G" terminal. Alternatively, TRIAC 308 can be implemented as two TRIACs TR1 and TR2 (not shown), where TRIAC TR1 is controlled by digital control electronics 304, which applies a fire signal onto control line 310 to turn on TRIAC TR2, which in turn gates TRIAC TR1 allowing an AC signal to pass through load 302 and back to the power source via neutral wire 312.

Connected in series to TRIAC 308 is mechanical switch 316. Mechanical switch 316 can be an "air gap switch" that can be activated to stop current flow through phase wire 314, load wire 318, load 302 and neutral wire 312 (mechanical switch 316 disconnects power to the dimmer 300 as a whole and load 302 to permit servicing and/or replacement of a light bulb, etc.). TRIAC 308 can be gated to provide current amounts related to intensities of load 302 (for example intensity of the light if load 302 includes a lighting element, fan speed if light 302 includes a fan, etc.) or can be gated to provide substantially no current thus essentially switching off load 302.

Power supply 320 is provided to power operation of component(s) of dimmer 300. Power supply may receive power from the phase line 314, in one example. The power supply 320 may power, for instance, operation of digital control electronics 304. Digital control electronics can be coupled to a zero-crossing detector circuit 322. A microprocessor (not pictured) of digital control electronics 304 can use the output of zero-crossing detector 322 for various timing functions, such as the proper timing of pulses/signals that the microprocessor generates to control TRIAC 308.

Some issues that may be experienced with two-wire dimmers are set forth below:

Current leakage when dealing with small loads (such as an LED) can be a problem—for instance the LED may blink or glow even when the dimmer is 'off', because the leakage is power that is being consumed and delivered to the load.

The zero-crossing signal can be different from/misaligned with the voltage phase, since the dimmer does not have direct access to the neutral. This lack of synchronization can result in flickering of the load.

When the load is burned-out or otherwise non-functioning, a dimmer component meant to signal functioning of the unit (such as a glowing light) may be unable to indicate this, creating a misperception that it is dimmer, rather than the load, that is not functioning properly.

Some dimmers may incorporate dual power supplies, with one power supply powering functioning of the dimmer when the dimmer receives power based on powering the load, and the other power supply powering functioning of the dimmer when the load is burned-out/non-functioning.

In accordance with aspects described herein, dimmers are provided that include a power supply deriving power from a connection to ground. Such power supply is capable of fully powering (or powering at least a majority of) operation of the dimmer, independent of the load parameters, e.g. regardless of the size or state (functioning/non-functioning) of the load. Moreover, the dimmer can derive accurate zero-crossing signals from the ground connection to ensure that the firing of the power switch is synchronized with the line voltage. Additionally, the amount of power derived from the ground connection may be sufficient to power operation of the dimmer while maintaining ground current leakage level below a specified amount (such as the current 500 microamp specification).

Aspects may be enabled through the provision of a ground leakage power supply. A ground leakage power supply in accordance with aspects described herein is one that uses the safety ground connection (such as earth ground 202) to power the dimmer during normal, and perhaps abnormal (such as when the load is burned out), operating conditions. The ground leakage power supply is implemented preferably using switching-mode power consumption (a 'switching-mode power supply', or 'switch-mode power supply'). The switching-mode power supply is built using flyback topology with an unisolated circuit in which the low voltage output ground (434 of FIG. 4, described below) is electrically connected to the input (hot/phase 414 of FIG. 4), and is optimized to provide power for dimming applications, e.g. fully powering a dimmer, while using relatively low input current. Level of input current may be below a threshold current value established by a specification, such as one promulgated by UL (Underwriters Laboratories).

Figure 4:
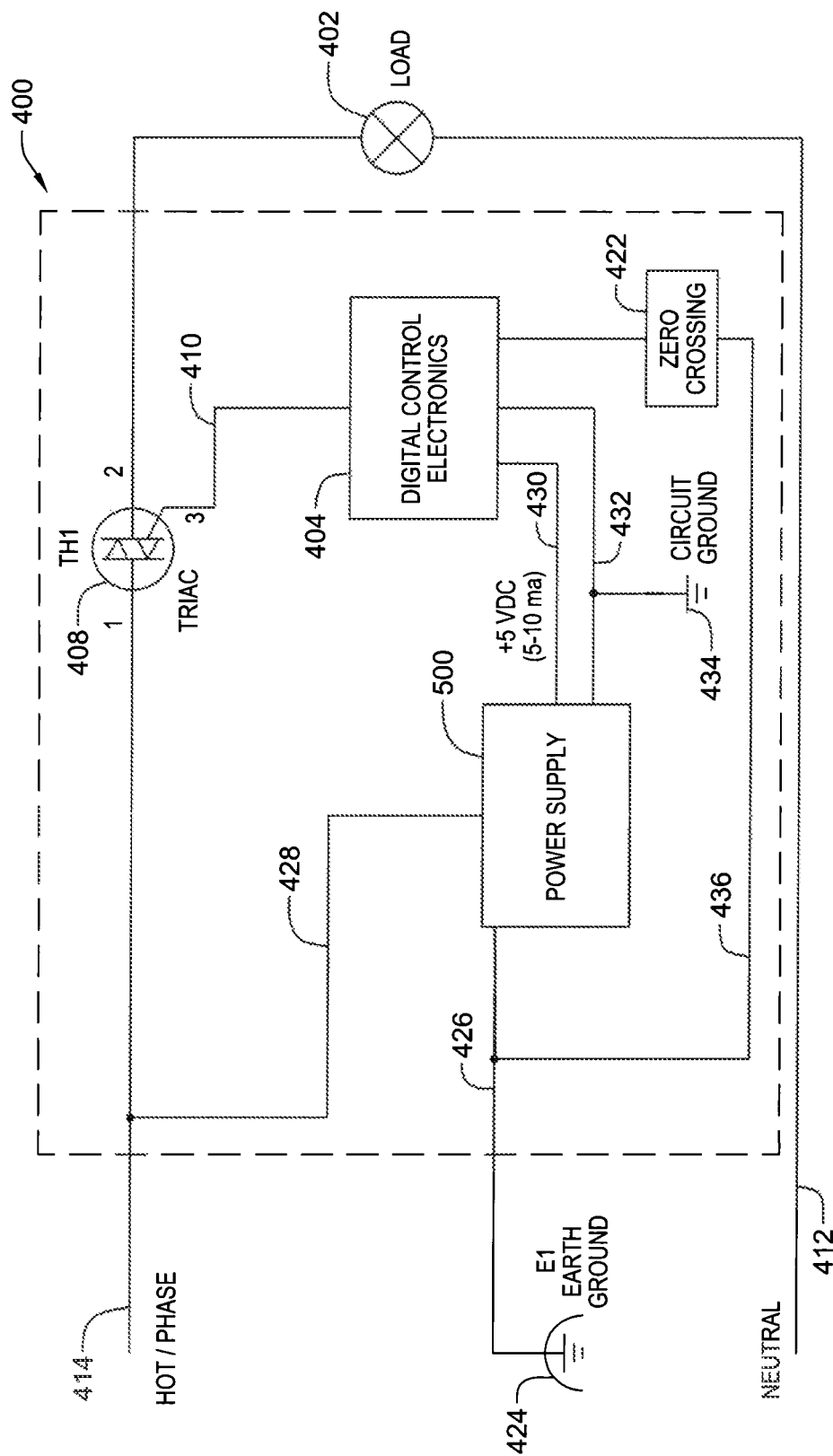
FIG. 4 depicts an example dimmer incorporating a ground leakage power supply according to aspects described herein.

FIG. 4 depicts an example dimmer incorporating a ground leakage power supply according to aspects described herein. Dimmer 400 controls the amount of current flowing through load 402 by activating TRIAC 408, controlled by digital control electronics 404 via signaling on control line 410. The AC signal on hot/phase line 414 passes through TRIAC 408 and load 402 to the power source via neutral wire 412. The signaling by the control electronics 404 is controlled, in part, based on signals received by zero-crossing detection circuitry 422 having a connection 436 to earth ground.

Powering control electronics 404 is power supply 500, having a connection to earth ground 424 via line 426, and being connected to the hot/phase AC line 414 via line 428. Power supply 500 powers control electronics 404 via power line 430 which provides a relatively low voltage (such as 3.3V or 5V) DC power. In this example, +5V DC power at 5-10 milliamps is provided. Power supply 500 and control electronics 404 are also connected via ground line 432 connected to the circuit ground connection 434 for the dimmer.

Figure 5:
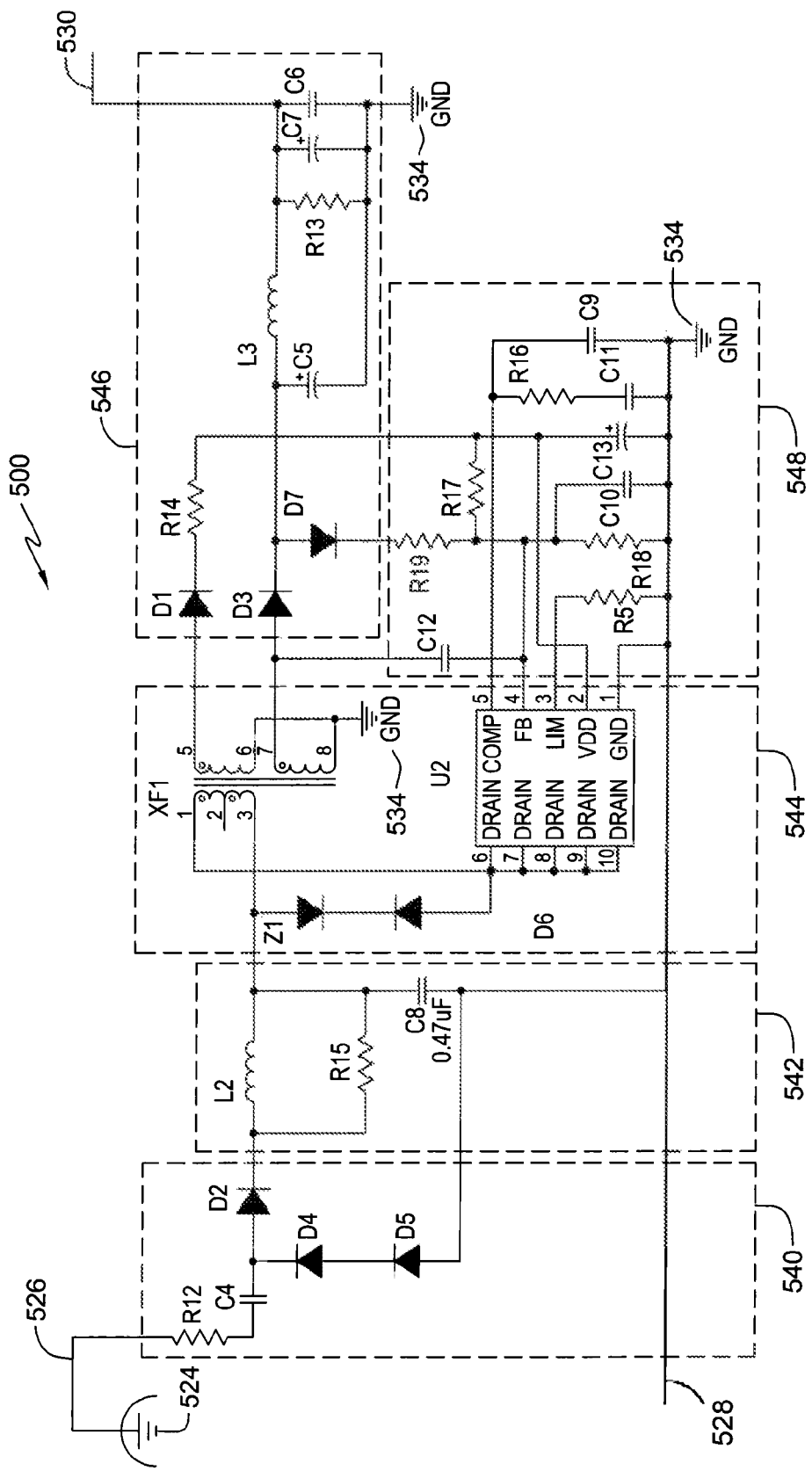
FIG. 5 depicts an example ground leakage power supply of a dimmer, in accordance with aspects described herein.

Further details of power supply 500 are now provided with reference to FIG. 5, which depicts an example ground leakage power supply of a dimmer in accordance with aspects described herein. Power supply 500 has a connection to earth ground 524 (via line 526) and to the hot/phase line by the electrical connection 528 between the circuit ground (534) and the input hot/phase connection or terminal, as described above with reference to FIG. 4. Finally, power supply provides power for other component(s) of the dimmer, for instance the digital control electronics thereof, via line 530, which in some examples provides 3.3 to 5 volts of power at about 5 milliamps.

The present embodiment of dimmer 500 is described with reference to seven functional units ("sections"). It should be understood that alternate embodiments may include additional or fewer sections. The first section 540 includes an AC/DC rectifier and input voltage doubler built using a resistor R12, capacitor C4, and diodes D2, D4, and D5. Section 540 performs preliminary limitation of the input current, rectifying the input voltage and doubling it. The function of section 540 is to convert AC line voltage to high voltage DC with the primary input current limitation.

Section 542 includes an input filter, which contains an inductor L2, resistor R15 and capacitor C8. The section performs input DC voltage filtration (linearizes the high level DC voltage from the input rectifier of section 540), reduces electromagnetic interference (EMI) disorders, and provides energy storage function for the power supply.

Section 544 contains a high voltage switching system of the power supply. It includes a transformer XF1, switching controller U2, diode Z1 and diode Z6. The high-voltage switching system performs a step-down conversion of the high level DC voltage from the input filter to the low voltage level switching output of the power supply by using step-down switching mode flyback topology. In one particular example, switching controller U2 may be a Viper06XS device offered by STMicroelectronics N.V. (Geneva, Switzerland). Such controller can provide functions including output line short circuit and input overvoltage protections.

Optionally, a zero link mode of operation together with the combined direct auxiliary and capacitive output feedback provides effective output voltage and current regulation, and guaranteed input current control.

An output rectifier and filter section 546 includes diodes D1, D3 and D7, resistors R13 and R14, capacitors C5, C6 and C7, and inductor L3. This section performs the rectifying and filtering of the low voltage level switching output (from 544) to provide power across line 530 to, e.g. a microcontroller of the dimmer. This section also performs output current limiting to prevent hiccup mode of the power supply and provides the low voltage powering of the switching controller U2.

Finally a feedback control system section 548 provides feedback control of the output voltage. This section contains resistors R5, R16, R17, R18, and R19, and capacitors C9, C10, C11, C12, and C13. Section 548 provides output voltage regulation by organizing the control of switching mode operation of the power supply to regulate for the stated output voltage.

Optionally includable in separate section(s) of the power supply, or incorporated into one or more of the above sections, may be (i) further output control and voltage regulation to provide noiseless, linear output voltage (if it is necessary), by using an additional linear regulator with a very low quiescent current, and/or (ii) further input current limiting to limit the input current to at or below some specification, such as the 500 uA specification in order to avoid activating a ground fault circuit interrupter (GFCI) or other protection.

A power supply as disclosed herein and with reference to FIG. 5 can be incorporated into a dimming system for controlling power supply to a load. In particular embodiments, the power supply operates with a 120 volt alternating current line, with the input current (input into the power supply via the ground connection) being up to 500 μA. In some embodiments, the power supply can provide 30 milliwatts of output power while consuming up to 500 microamperes (500 μA=one-half milliampere), or less, from an AC line (such as ground), and can provide output power of about 2-12 volts with a steady stream of current of about 6 mA. Thus, it can be used in applications expecting, as an example, input current of up to 6 mA and up to 5 v input voltage, despite being powered solely through a ground connection. Such applications may include component(s) of digital control electronics of a dimmer, such as microcontrollers, small gate drivers, Operational Amplifiers, and other devices for which the biasing current will not exceed the stated range, for instance applications containing a microcontroller, power switch (e.g. TRIAC or MOSFET) driver, analog circuit for zero-crossing detection, and other circuits for a user interface. Thus, aspects described herein may enable a dimmer to be fully operational solely from power derived through ground leakage current, while avoiding activation of the ground-fault circuit interrupter protection at the 500 μA UL-specified threshold.

Optionally, the dimmer may include multiple power supplies, with a ground leakage power supply as disclosed herein being a primary power source for powering operation of the dimmer, and the dimmer further including one or more secondary power supplies/sources.

Further in some embodiments, a power supply according to aspects described herein includes input and output current limiters, output line short-circuit, and overvoltage protections. Automatic, reliable, and highly-effective output overcurrent and short-circuit protection is therefore provided by aspects described herein. Further enabled is the detection of load reconnection and automatically restarting of proper regulation. That is, the power supply provides the effective voltage and current regulation on the connected load, and, in case of a load disconnection, the power supply enters a no-load mode of operation in which it continues to provide the normal output voltage (about 5V in the examples above). The power supply will then return to the normal output voltage and current regulation when the load is connected again. This enables extremely low power consumption (about 5 milliwatts) in the no-load mode of operation.

A significant reduction in EMI disorders due to switching frequency jitter is further provided. For instance the switching controller US can provide 30 kHz (as an example) carrier frequency and can include an advanced built-in switching frequency jittering system, which provides modulation of the carrier frequency with depth of ±3 kHz and frequency of 230 Hz for reducing the EMI disorders and enables possible reduction in the cost of the input EMI filter.

In order to minimize current usage of the controlling dimmer circuitry to ensure that dimmers as described herein can provide adequate power to the dimmer without exceeding the 500 μA UL requirement, further enhancements may be incorporated into the dimmer and/or processes of the microcontroller/digital control electronics (e.g. 404). As an example, tasks to be performed by the microcontroller may be prioritized based on sensitivity to response time. When a task of higher priority is running, the clock speed of the microcontroller can be increased in order to decrease the response time. Conversely, when a lower priority task is running, the clock speed of the microcontroller can be decreased to limit current consumption.

As another enhancement, as explained above, the TRIAC or other power switch may be gated with a pulse width modulation (PWM) pulse in place of a flat fire gate pulse holding through the remainder of the half-cycle. In some examples, the PWM pulse is about 10 microseconds in duration, and is repeated approximately every 10 microseconds. The pause between pulses may be kept less than the time necessary to unlatch the power switch. This may repeat for approximately the remainder of the half-cycle. Usage of this approach can save approximately 1 milliamp or greater, which is a significant improvement.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A dimmer for controlling power to a load, the dimmer comprising:
   a phase input terminal configured to couple to an AC power source;
   a ground terminal configured to couple to a ground connection of the AC power source;
   a load output terminal configured to couple to the load;
   a switching circuit electrically coupled between the phase input terminal and the load output terminal;
   a controller configured to control the switching circuit such that power to the load is selectively controlled; and
   a ground leakage power supply, wherein the ground leakage power supply is a switched mode power supply electrically coupled to the phase input and ground terminals, wherein the ground leakage power supply derives power only from the phase input and ground terminals;
   wherein the controller receives power from the ground leakage power supply.

2. The dimmer of claim 1, wherein operation of the dimmer is powered fully by the ground leakage power supply.

3. The dimmer of claim 1, wherein the dimmer comprises one or more secondary power sources.

4. The dimmer of claim 3, wherein the ground leakage power supply is configured to provide a majority of the power needed to power the operation of the dimmer.

5. The dimmer of claim 1, wherein the ground leakage power supply is configured to power operation of the dimmer absent a connection of the dimmer to a neutral of the AC power source.

6. The dimmer of claim 1, wherein the power derived by the ground leakage power supply is regulated by maintaining a current flowing through the ground terminal below a threshold current.

7. The dimmer of claim 6, wherein the threshold current comprises 500 microamperes or less.

8. The dimmer of claim 1, wherein the ground leakage power supply provides a minimum of 5 volts.

9. The dimmer of claim 1, wherein the controller is configured to perform:
   regulating a clock speed of the controller based on priority of a task selected to run, wherein the controller decreases clock speed based on a task of relatively low priority being selected to run.

10. The dimmer of claim 1, wherein the controller is configured to perform:
    providing a signal to the switching circuit to selectively control power to the load, the signal to the switching circuit comprising a plurality of pulses, and the signal provided starting at a firing angle of a half-cycle of the AC power source.

11. The dimmer of claim 10, wherein providing the signal comprises providing the plurality of pulses to have a duration therebetween of less than an unlatching time of the switching circuit.

12. The dimmer of claim 10, wherein providing the signal comprises providing the plurality of pulses to have a duration of 8-12 microseconds and to have a duration therebetween of 8-12 microseconds.

13. A dimmer for controlling power to a load, the dimmer comprising:
    a phase input terminal configured to couple to an AC power source;
    a ground terminal configured to couple to a ground connection of the AC power source;
    a load output terminal configured to couple to the load;
    a switching circuit electrically coupled between the phase input terminal and the load output terminal, wherein the controller is configured to provide a signal to the switching circuit to selectively control power to the load, the signal provided starting at a firing angle of a half-cycle of the AC power source, and the signal comprising a plurality of pulses provided during the half-cycle of the AC power source;
    a controller configured to control the switching circuit such that power to the load is selectively controlled; and
    a ground leakage power supply, wherein the ground leakage power supply is a switched mode power supply electrically coupled to the phase input and ground terminals, wherein the ground leakage power supply derives power only from the phase input and ground terminals;
    wherein the controller receives power from the ground leakage power supply.

14. The dimmer of claim 13, wherein the plurality of pulses have a duration therebetween of less than an unlatching time of the switching circuit.

15. The dimmer of claim 13, wherein the plurality of pulses have a duration of 8-12 microseconds and have a duration therebetween of 8-12 microseconds.

16. A dimmer for controlling power to a load, the dimmer comprising:
    a phase input terminal configured to couple to an AC power source;
    a ground terminal configured to couple to a ground connection of the AC power source;
    a load output terminal configured to couple to the load;
    a switching circuit electrically coupled between the phase input terminal and the load output terminal, wherein the controller is configured to provide a signal to the switching circuit to selectively control power to the load, the signal comprising a plurality of pulses provided during a half-cycle of the AC power source, and the plurality of pulses having a duration of 8-12 microseconds and having a duration therebetween of 8-12 microseconds;
    a controller configured to control the switching circuit such that power to the load is selectively controlled; and
    a ground leakage power supply, wherein the ground leakage power supply is a switched mode power supply electrically coupled to the phase input and ground terminals, wherein the ground leakage power to supply derives power only from the phase input and ground terminals;
    wherein the controller receives power from the ground leakage power supply.

17. The dimmer of claim 6, wherein the ground leakage power supply regulates the power derived by the ground leakage power supply.

18. The dimmer of claim 6, wherein the controller regulates the power derived by the ground leakage power supply.

19. The dimmer of claim 13, wherein the power derived by the ground leakage power supply is regulated by maintaining a current flowing through the ground terminal below a threshold current, wherein the threshold current comprises 500 microamperes or less.

20. The dimmer of claim 16, wherein the power derived by the ground leakage power supply is regulated by maintaining a current flowing through the ground terminal below a threshold current, wherein the threshold current comprises 500 microamperes or less.

* * * * *

UNITED STATES PATENT AND TRADEMARK OFFICE
CERTIFICATE OF CORRECTION

PATENT NO. : 9,812,969 B2  
APPLICATION NO. : 14/554697  
DATED : November 7, 2017  
INVENTOR(S) : Papismedov et al.

Page 1 of 1

It is certified that error appears in the above-identified patent and that said Letters Patent is hereby corrected as shown below:

In the Claims

Column 12, Lines 24 and 25: Claim 13, Delete "supplyelectrically" and insert -- supply electrically --

Signed and Sealed this
Second Day of January, 2018

Joseph Matal
*Performing the Functions and Duties of the*
*Under Secretary of Commerce for Intellectual Property and*
*Director of the United States Patent and Trademark Office*